United States Patent
Frank et al.

(10) Patent No.: US 7,603,716 B2
(45) Date of Patent: Oct. 13, 2009

(54) DISTRIBUTED NETWORK SECURITY SERVICE

(75) Inventors: Alexander Frank, Bellevue, WA (US); James S. Duffus, Seattle, WA (US); Thomas G. Phillips, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 856 days.

(21) Appl. No.: 11/224,605

(22) Filed: Sep. 12, 2005

(65) Prior Publication Data

US 2006/0064754 A1 Mar. 23, 2006

Related U.S. Application Data

(63) Continuation-in-part of application No. 10/880,179, filed on Jun. 29, 2004, and a continuation-in-part of application No. 10/880,049, filed on Jun. 29, 2004, and a continuation-in-part of application No. 10/879,837, filed on Jun. 29, 2004.

(60) Provisional application No. 60/544,884, filed on Feb. 13, 2004, provisional application No. 60/544,783, filed on Feb. 13, 2004, provisional application No. 60/544,772, filed on Feb. 13, 2004.

(51) Int. Cl.
*G06F 21/00* (2006.01)
*G06F 21/20* (2006.01)

(52) U.S. Cl. ............................. 726/25; 726/22; 726/23; 726/24

(58) Field of Classification Search ............... 726/22–25
See application file for complete search history.

(56) References Cited

U.S. PATENT DOCUMENTS

| | | | |
|---|---|---|---|
| 5,987,376 A | 11/1999 | Olson et al. |
| 6,088,805 A | 7/2000 | Davis et al. |
| 6,128,738 A | 10/2000 | Doyle et al. |
| 6,233,606 B1 | 5/2001 | Dujari |
| 6,269,099 B1 | 7/2001 | Borella et al. |
| 6,279,110 B1 | 8/2001 | Johnson et al. |
| 6,308,266 B1 | 10/2001 | Freeman |
| 6,327,652 B1 | 12/2001 | England et al. |
| 6,341,349 B1 | 1/2002 | Takaragi et al. |
| 6,367,009 B1 | 4/2002 | Davis et al. |
| 6,397,303 B1 | 5/2002 | Arimilli et al. |

(Continued)

FOREIGN PATENT DOCUMENTS

EP   1 248 441 A2   10/2002

(Continued)

OTHER PUBLICATIONS

FAQ: Network Intrusion Detection System, Mar. 21, 2000, Linux.*

(Continued)

*Primary Examiner*—Carl Colin
*Assistant Examiner*—Lisa Lewis
(74) *Attorney, Agent, or Firm*—Marshall, Gerstein & Borun LLP

(57) ABSTRACT

A method and apparatus to distribute a network security service is disclosed. The security software may be distributed across nodes on a network and may use a separate security device that has two channels, one to review network traffic and a second to send updates to other security devices.

6 Claims, 4 Drawing Sheets

U.S. PATENT DOCUMENTS

| | | | |
|---|---|---|---|
| 6,405,290 | B1 | 6/2002 | Arimilli et al. |
| 6,424,718 | B1 | 7/2002 | Holloway |
| 6,782,294 | B2 | 8/2004 | Reich et al. |
| 6,938,166 | B1 | 8/2005 | Sarfati et al. |
| 6,941,366 | B2 | 9/2005 | Antes et al. |
| 6,941,384 | B1 | 9/2005 | Aiken, Jr. et al. |
| 7,461,403 | B1* | 12/2008 | Libenzi et al. ............... 726/24 |
| 2002/0032765 | A1 | 3/2002 | Pezzutti |
| 2002/0143989 | A1 | 10/2002 | Huitema et al. |
| 2002/0156875 | A1 | 10/2002 | Pabla |
| 2003/0018701 | A1 | 1/2003 | Kaestle |
| 2003/0018813 | A1 | 1/2003 | Antes et al. |
| 2003/0196060 | A1 | 10/2003 | Miller |
| 2004/0034794 | A1 | 2/2004 | Mayer |
| 2004/0181689 | A1 | 9/2004 | Kiyoto |
| 2004/0243819 | A1 | 12/2004 | Bourne et al. |
| 2005/0027871 | A1 | 2/2005 | Bradley |
| 2005/0055280 | A1 | 3/2005 | Jeans |
| 2005/0076218 | A1 | 4/2005 | Brown |
| 2005/0160291 | A1 | 7/2005 | Eden et al. |
| 2005/0160477 | A1 | 7/2005 | Saito |
| 2005/0182928 | A1 | 8/2005 | Kamalanathan et al. |
| 2005/0193219 | A1 | 9/2005 | Vanstone |
| 2006/0212572 | A1* | 9/2006 | Afek et al. ............... 709/225 |
| 2008/0016568 | A1* | 1/2008 | Szor et al. ............... 726/22 |

FOREIGN PATENT DOCUMENTS

| | | |
|---|---|---|
| EP | 1 361 728 A2 | 11/2003 |
| WO | WO-2005/026872 A2 | 3/2005 |
| WO | WO-2005/078993 A1 | 8/2005 |

OTHER PUBLICATIONS

Understanding Active Directory Replication. Feb. 17, 2000, 171-180.*

Smith, Implementing Least Privilege with AD, Feb. 21, 2002.*

McAfee Access Control 3.0 Product and Installation Guide, 2008.*

IT World: McAfee announces new slate of 2002 security Products, Aug. 31, 2001.*

Campbell, C., "Securing Your Peer-to-Peer Networks," TechTarget, Sep. 12, 2001, http://searchsecurity.techtarget.com/originalContent/0,289142,sid14_gci769396,00.html?MOTT=9.25.

Ajmani et al., "ConChord: Cooperative SDSI Certificate Storage and Name Resolution," First International Workshop on Peer-to-Peer Systems (IPTPS), Mar. 2002.

Ellison, C., et al., Simple Public Key Certificate, (Internet Draft 1999), at http://www.world.std.com/~cme/spki.txt (Aug. 6, 2001).

Ellison, C., et al., SPKI Certificate Theory, (The Internet Society 1999), at http://www.ietf.org/rfc/rfc2693.txt?number=2693 (Aug. 6, 2001).

Ellison, C., SPKI Requirements, (The Internet Society 1999), at http://www.ietf.org/rfc/rfc2692.txt?number=2692 (Aug. 6, 2001).

Erdelsky, P., The Birthday Paradox, EFG, at http://www.efgh.com/math/birthday.htm (Mar. 8, 2002).

Housley et al., "Internet X.509 Public Key Infrastructure Certificate and CRL Profile." Network Working Group (Jan. 1999), pp. 1-121, retrieved from http://www.ietf.org/rfc/rfc2459.txt?number=2459 Sep. 18, 2003.

Jianming Lv et al., "WonGoo: A Pure Peer-to-Peer Full Text Information Retrieval System Based On Semantic Overlay Networks;" Institute of Computing Technology Chinese Academy of Sciences Beijing, China; Proceedings of the Third IEEE International Symposium on Network Computing and Applications (NCA '04); dated Apr. 2004; 8 pages; http://portal.acm.org/citation.cfm?id=1025126.1025936.

Kim et al., "A Secure Platform for Peer-to-Peer Computing in the Internet," Proceedings of the 35th Hawaii International Conference on System Sciences, IEEE Computer Society, 2002, pp. 3948-3957.

Langley, A., The Freenet Protocol, The Free Network Project, at http://freenet.sourceforge.net/index/php?page=protocol (May 21, 2001).

Mazieres et al., "Separating Key Management from File System Security," Operating Systems Review ACM, vol. 33, No. 5, Dec. 1999, pp. 124-139.

Red-Black Tree, National Institute of Standards and Technology, at http://www.nist.gov/dads/HTML/redblack.html (Mar. 5, 2002).

* cited by examiner

DISTRIBUTED NETWORK SECURITY SERVICE

RELATED APPLICATION DATA

This application is a continuation-in-part of U.S. Ser. No. 10/880,049 filed Jun. 29, 2004, which claims priority to U.S. Provisional Application Ser. No. 60/544,783 filed Feb. 13, 2004; a continuation-in-part of U.S. Ser. No. 10/880,179 filed Jun. 29, 2004 which claims priority to U.S. Provisional Application Ser. No. 60/544,884, filed Feb. 13, 2004; and a continuation-in-part of U.S. Ser. No. 10/879,837, filed on Jun. 29, 2004, which claims priority to U.S. Provisional Application Ser. No. 60/544,772 filed Feb. 13, 2004.

BACKGROUND

As networks continue to grow in use, the importance of having safe and secure networks have increase. Applications to address security concerns have been developed but writers of viruses quickly adjust to avoid the security applications. In addition, virus writers will attack nodes that are supplying security application updates.

SUMMARY

A method and apparatus to distribute a network security service is disclosed. The security software may be distributed across nodes on a network. The software may observe network traffic and search for possibly malicious communication. If a malicious communication is found, a response may be created and be distributed to other network nodes and additional networks. The method may also use a security device that has first and second communication channel that may spoof suspected malicious nodes and based on the response, may use the second communication channel, which may be secure, to notify other nodes of the threat and possible responses.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
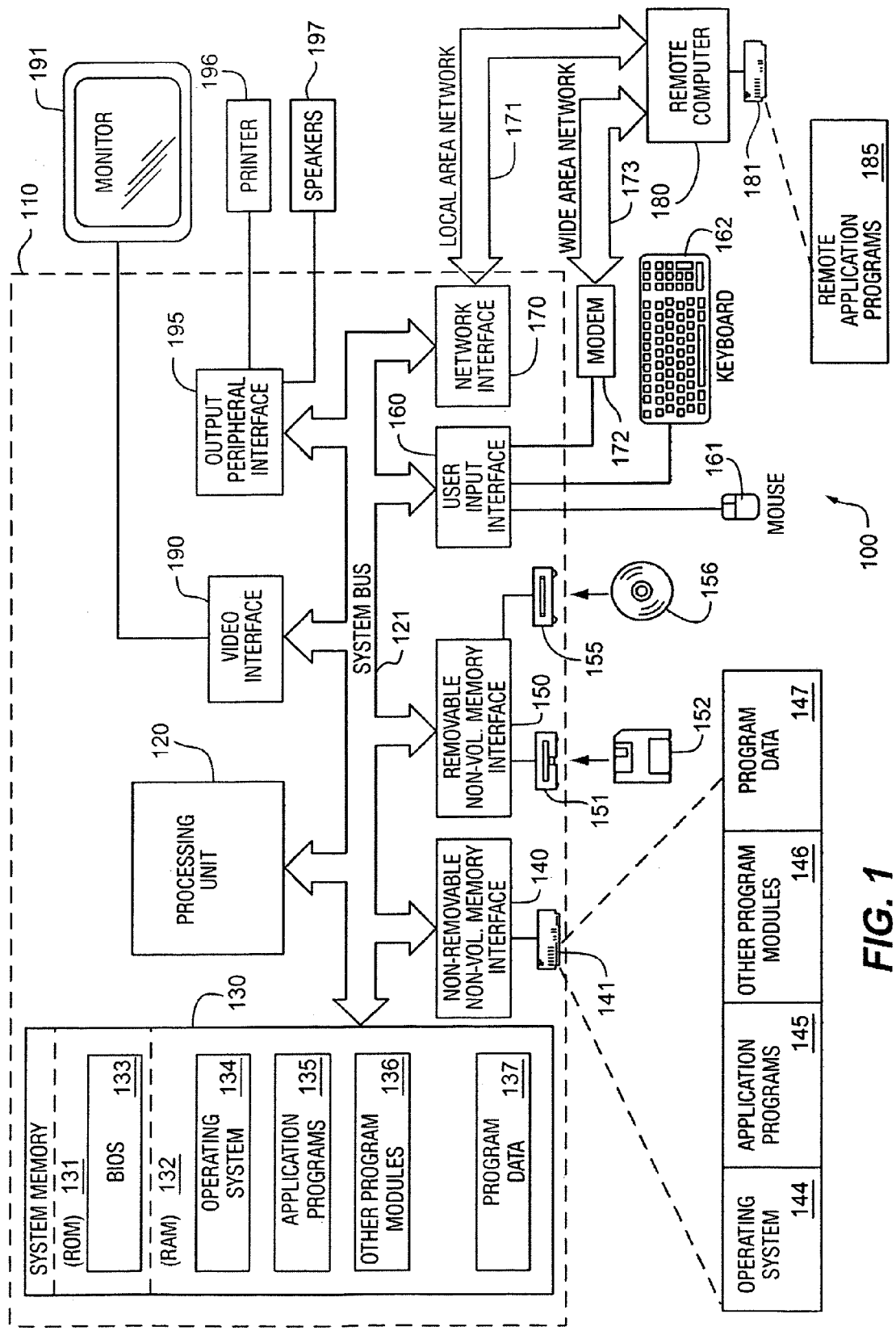
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
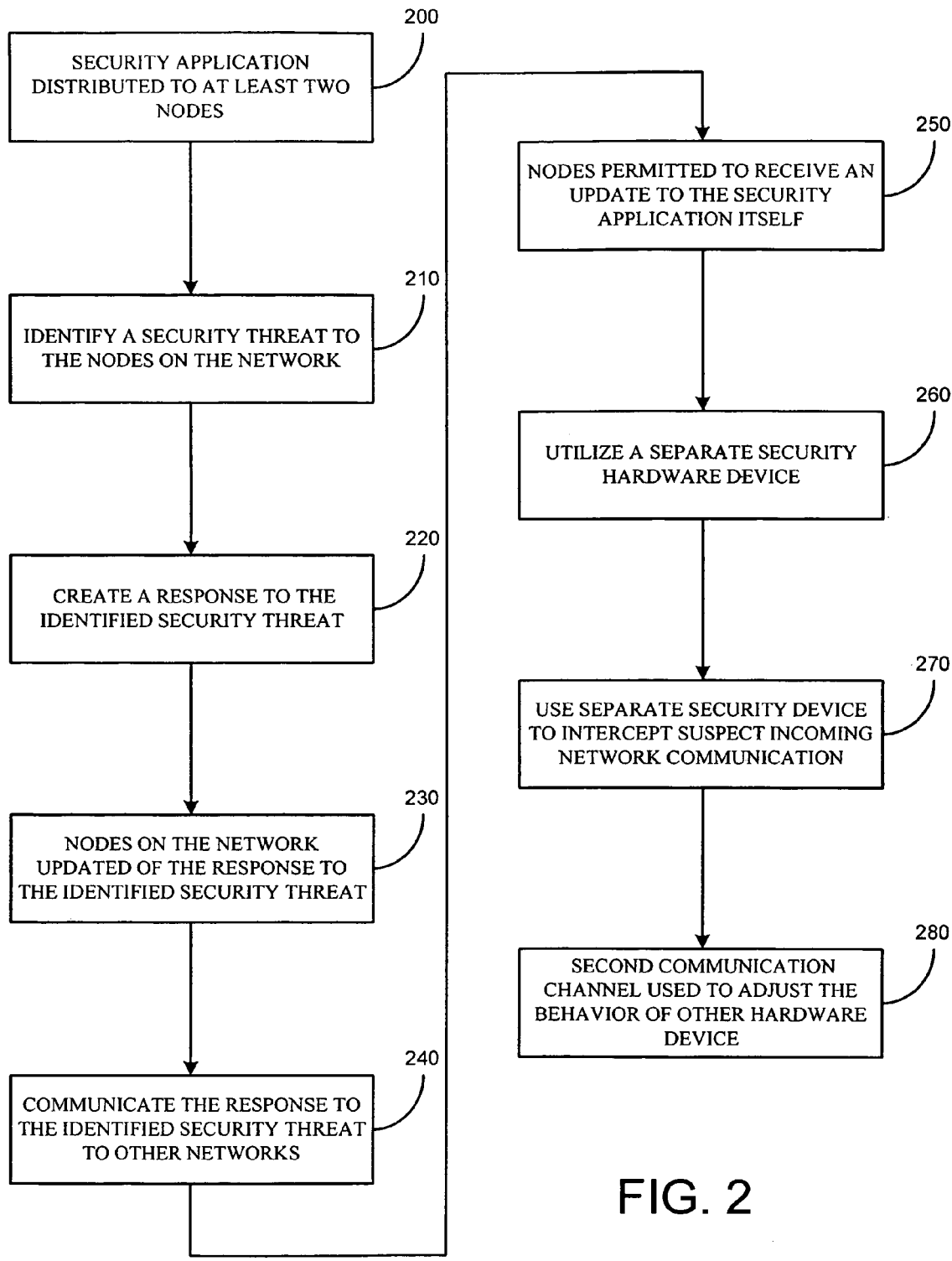
FIG. 2 is a method of providing a distributed security system in accordance with the claims.

FIG. 2 may be an illustration of a method of providing a distributed network security service. The method may be applied to a network as broad as the Internet as an illustrated in FIG. 3 or as narrow as a peer to peer network illustrated in FIG. 4. At block 200, a security application may be distributed to at least two nodes (300, 310 in FIG. 3 or 400, 410 in FIG. 4) on a network. Distributed computing is a powerful concept where a single application is split into parts which operate on separate computing devices. In this way, a single computing device does not become bogged down running the entire application. In addition, as the application is spread over numerous computing devices, there is no single point of failure (or single point to attack) for the application. The various application parts can be stored in a redundant manner on a plurality of computing devices further ensuring that if one computing device fails or is subject to attack, the other nodes on the network can execute the distributed application. A variety of manners of distributing the single application are known and may be appropriate in view of the claims.

At block 210, the security application may identify a security threat to the nodes on the network. Security threats are only too well known and the variety of security threats continues to grow. Common threats include viruses, worms and attempts to take control of a user's computer. Modern security programs can identify security threats based on a variety of factors such as file names, traffic similar to previously created viruses, malformed packets, sending address, etc.

At block 220, the security application may create a response to the identified security threat. There are a variety of possible responses, such as blocking traffic from a malicious node 320 (FIG. 3) 420 (FIG. 4), replicating executable programs that address the threat, replicating policy updates, replicating signature updates, or replicating security profiles. Other responses may include reducing the privilege for any similar traffic from the originating subnet of the identified security threat and/or reducing privilege for any similar traffic with their own subnet. Yet a further response may be to create a plurality of security levels and adjusting the level of security based on an analysis of the suspect nodes and suspect messages.

At block 230, other nodes on the network may be updated of the response to the identified security threat. For example, referring to FIG. 3, device1 310 which may execute the security application, may inform device2 315 of the response to the security threat. Similarly, in FIG. 4, device1 410 may inform device2 415 of the response to the security threat. If the response is to block a particular malicious node 320 (FIG. 3) 420 (FIG. 4), the response may spread from device 310 410 to device 315 415 and the communication from the malicious node may be effectively blocked.

At block 240, the method may communicate the response to the identified security threat to other networks. For example, in FIG. 4, node2 405 may be a member of several peer to peer networks. Node2 405 may take the response to the identified security threat and distribute it to other nodes on the additional peer to peer networks of which it is a part. In addition, at block 250, the nodes may be permitted to receive an update to the security application itself. As with any program, bugs may be located or the code may be improved over time. Block 250 may allow the code to be updated over time.

Figure 3:
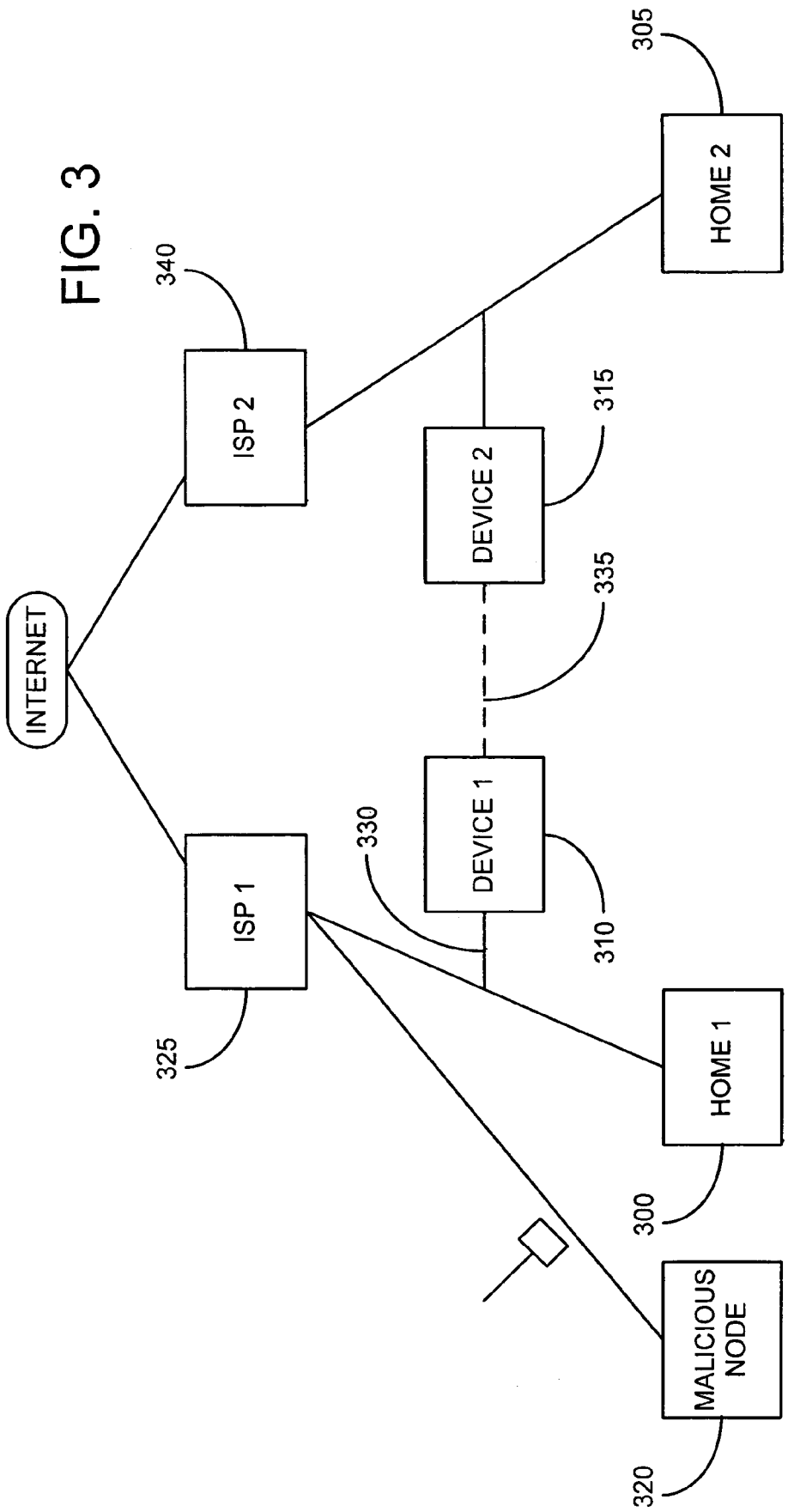
FIG. 3 is an illustration of a network that may implement the security method as described in the claims.
Figure 4:
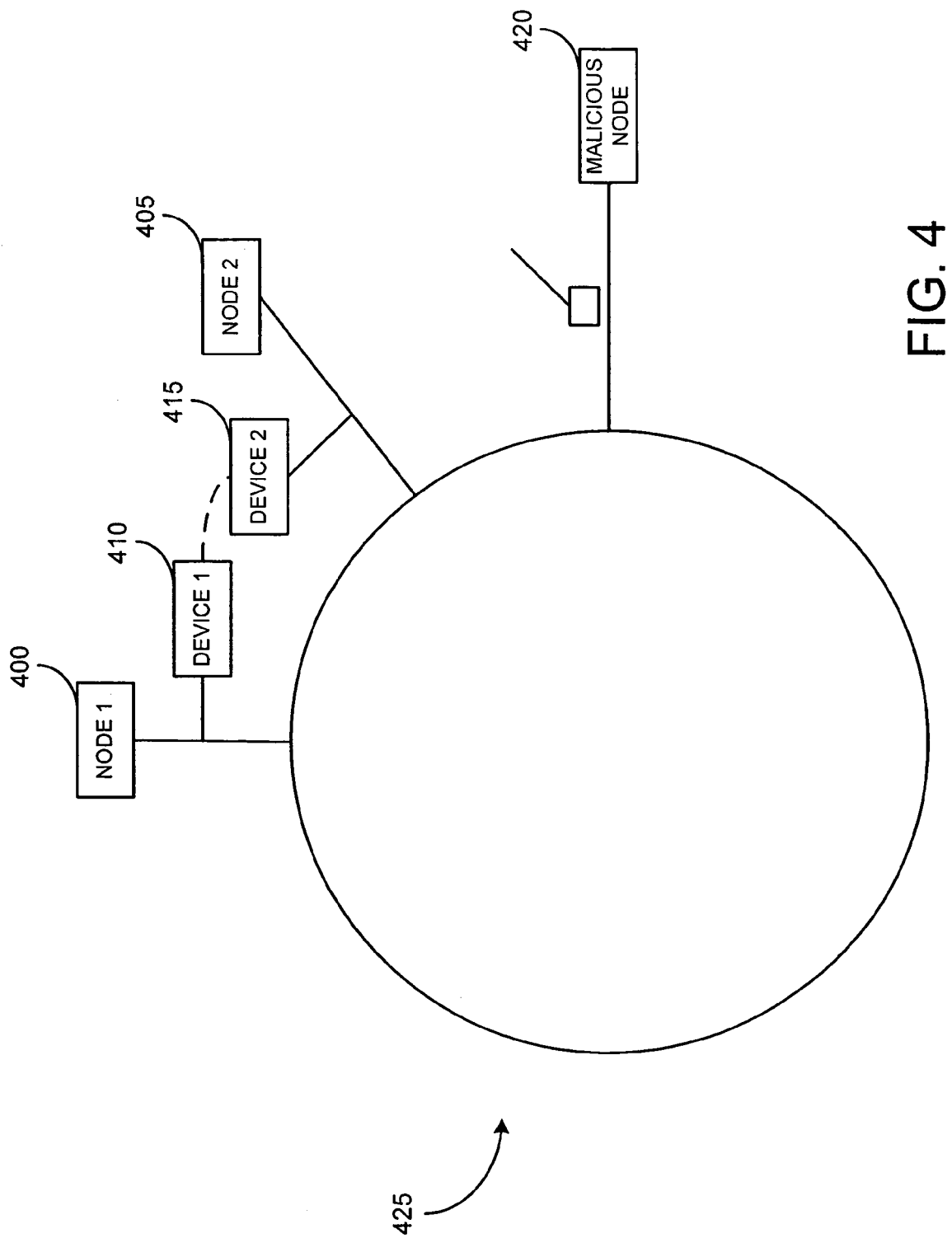
FIG. 4 is an illustration of a peer to peer network that may implement the security method as described in the claims.

At block 260, the method may utilize a separate security hardware device with a first communication channel and a second communication channel where the security hardware receives network communications on the first channel before determining whether to forward the network communications to the computer. Referring to FIG. 3, the device 310 may sit between an internet service provider ("ISP") 325 and a home device 300 that is accessing the internet. Referring to FIG. 4, the device 410 may also sit between a node 410 and a peer to peer network 425. The device may a have a first communication channel to communicate with the network, and a second channel to communicate with other security devices. For example, referring to FIG. 3, the first communication channel 330 may sit between the ISP1 325 and home1 300 and the second communication channel 335 may communicate with other security devices such as security device 315. The second communication channel 335 may be a secure communication channel and the second communication channel may be used to communicate updates to the security application and security responses. The second communication channel 335 may be a completely separate wired channel or may be a virtually separate channel such as a virtual private network.

Referring to FIG. 2, at block 270, the method may use the separate security device to intercept suspect incoming network communication from a suspect node, spoof a response to the suspect node and based on the suspect node's reply to the response, determining the response to the identified security threat. For example, referring to FIG. 3, device2 315 may suspect that some network traffic from ISP2 340 may be malicious such as from the malicious node 320. As mentioned previously, suspect network communication may be indicated by monitoring a computer of the subnet network for virus-like traffic and malformed packets. Before communicating the network traffic to home2 305, the security device 315 may send a response to the suspect malicious node 320 to test the node, such as offering to malicious node 320 access to something desirable. If the malicious node 320 acts on the offer, the security device 315 can determine that the suspected malicious node 320 truly is malicious. The security device 315 may then determine an appropriate response. There are a variety of possible responses, such as blocking traffic from the malicious node 320, replicating executable programs, replicating policy updates, replicating signature updates, or replicating security profiles. Other responses may include reducing the privilege for any similar traffic from the originating subnet of the identified security threat, reducing privilege for any similar traffic with their own subnet. Yet a further response may be to create a plurality of security levels and adjusting the level of security based on an analysis of the suspect nodes and suspect messages.

At block 280, the second communication channel may be used to adjust the behavior of other hardware device 310. The method may allow network computers to opt in to execute part of the distributed security application. If a network computer does opt in, the user may be forbidden from accessing the distributed security application.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of providing a distributed network security service comprising:
   splitting a security application into at least two parts;
   distributing each one of the at least two parts of the security application to at least two nodes on a network;
   executing the at least two parts of the security application on the at least two nodes on the network so that the security application is operated in a distributed manner on the network;
   using all of the at least two parts of the security application to identify a security threat to the nodes on the network by monitoring for virus-like traffic and malformed packets;
   if one of the at least two parts of the security application executed on a particular network node identifies a security threat, then creating a response to the identified security threat by (a) replicating executable programs, policy, signature or profile updates implemented on an originating network subnet on other networks subnets, (b) reducing the privilege for any similar traffic from the originating subnet of the identified security threat, (c) reducing privilege for any similar traffic with their own subnet, or (c) blocking transmissions from a source of malicious messages;

if one of the at least two parts of the security application executed on a particular network node identifies a security threat, then updating other nodes on the network of the response to the identified security threat;

using a separate security hardware device with a first communication channel and a second communication channel, wherein the security hardware device receives network communications on the first channel before determining whether to forward the network communications to an intended recipient for the network communications;

using the separate security hardware device to intercept suspect incoming network communications from a suspect node, to spoof a response to the suspect node, and, based on the suspect node's reply to the response, to determine the response to the identified security threat;

using the second communication channel to adjust the behavior of the separate hardware device;

wherein the second communication channel is a secure communication channel;

creating a plurality of security levels and adjusting the level of security based on an analysis of the suspect nodes and suspect messages;

allowing network computers to opt in to execute part of the distributed security application; and not permitting the user of the computer to access the distributed security application;

communicating the response to the identified security threat to other networks; and allowing the other nodes of the network to receive an update to the security application.

2. A method of providing a distributed network security service comprising:

splitting a security application into at least two parts;

distributing each one of the at least two parts of the security application to at least two nodes on a network;

executing the at least two parts of the security application on the at least two nodes on the network so that the security application is operated in a distributed manner on the network;

using all of the at least two parts of the security application to identify a security threat to the nodes on the network by monitoring for virus-like traffic and malformed packets;

if one of the at least two parts of the security application executed on a particular network node identifies a security threat, then updating other nodes on the network of the response to the identified security threat;

using a separate security hardware device with a first communication channel and a second communication channel, wherein the security hardware device receives network communications on the first channel before determining whether to forward the network communications to an intended recipient for the network communications;

using the separate security hardware device to intercept suspect incoming network communications from a suspect node, to spoof a response to the suspect node, and, based on the suspect node's reply to the response, to determine the response to the identified security threat;

using the second communication channel to adjust the behavior of the separate hardware device;

wherein the second communication channel is a secure communication channel;

creating a plurality of security levels and adjusting the level of security based on an analysis of the suspect nodes and suspect messages;

allowing network computers to opt in to execute part of the distributed security application; and not permitting the user of the computer to access the distributed security application;

communicating the response to the identified security threat to other networks; and allowing the other nodes of the network to receive an update to the security application.

3. The method of claim 2, wherein, if one of the at least two parts of the security application executed on a particular network node identifies a security threat, then creating a response to the identified security threat by replicating executable programs, policy, signature or profile updates implemented on an originating network subnet on other networks subnets.

4. The method of claim 2, wherein, if one of the at least two parts of the security application executed on a particular network node identifies a security threat, then creating a response to the identified security threat by reducing the privilege for any similar traffic from the originating subnet of the identified security threat.

5. The method of claim 2, wherein, if one of the at least two parts of the security application executed on a particular network node identifies a security threat, then creating a response to the identified security threat by reducing privilege for any similar traffic with their own subnet.

6. The method of claim 2, wherein, if one of the at least two parts of the security application executed on a particular network node identifies a security threat, then creating a response to the identified security threat by blocking transmissions from a source of malicious messages.

* * * * *

UNITED STATES PATENT AND TRADEMARK OFFICE
CERTIFICATE OF CORRECTION

PATENT NO. : 7,603,716 B2 Page 1 of 1
APPLICATION NO. : 11/224605
DATED : October 13, 2009
INVENTOR(S) : Frank et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Fifth Day of October, 2010

David J. Kappos
*Director of the United States Patent and Trademark Office*